Figure 1:
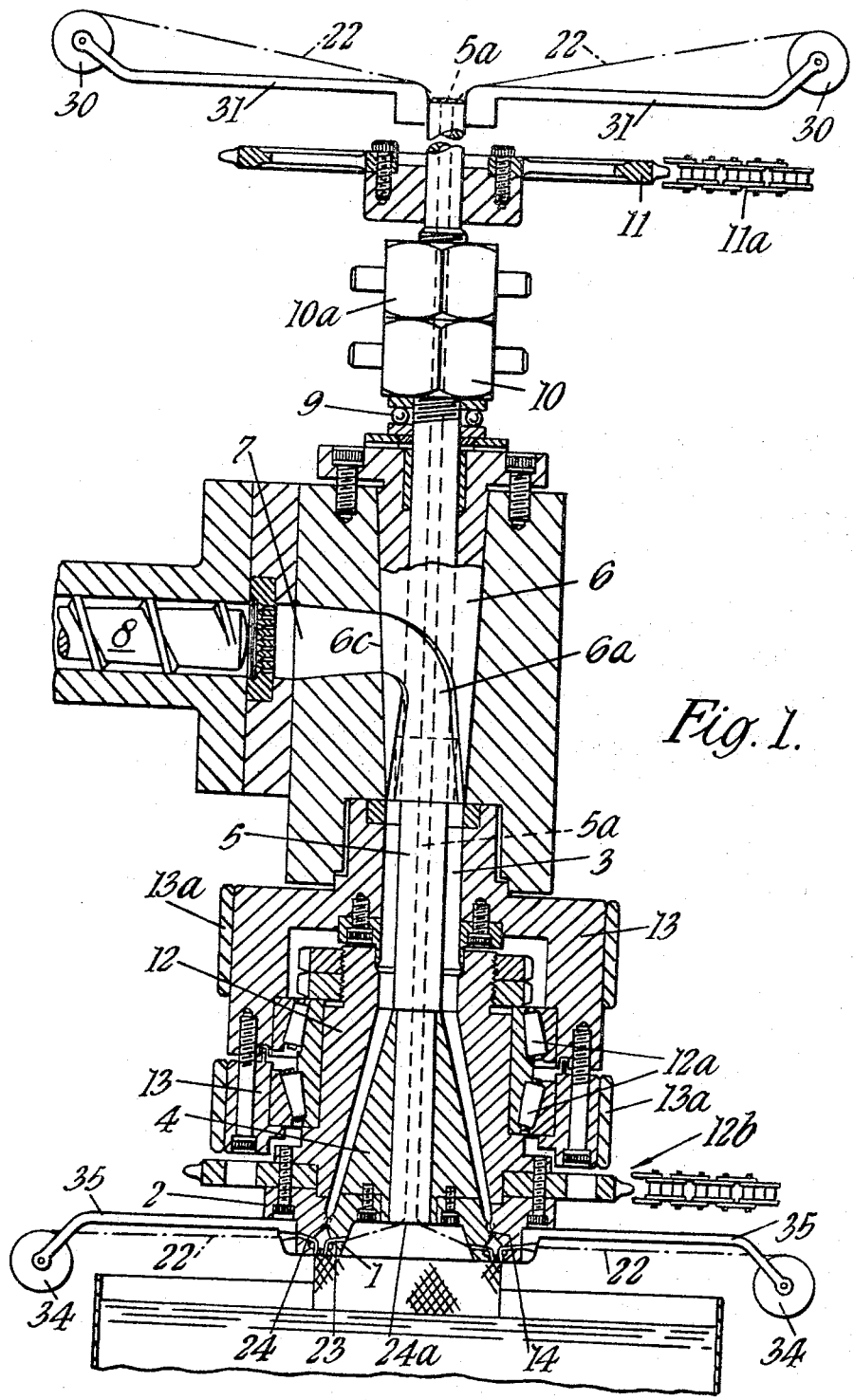

July 18, 1967

F. B. MERCER 3,331,725

APPARATUS FOR THE PRODUCTION OF EXTRUDED
PLASTIC NET OR NET-LIKE PRODUCTS

Filed Aug. 29, 1962

United States Patent Office 3,331,725
Patented July 18, 1967

3,331,725
APPARATUS FOR THE PRODUCTION OF EXTRUDED PLASTIC NET OR NET-LIKE PRODUCTS
Frank Brian Mercer, Blackburn, England, assignor to Plastic Textile Accessories Limited, Blackburn, England
Filed Aug. 29, 1962, Ser. No. 220,260
Claims priority, application Great Britain, Aug. 29, 1961, 31,035/61
8 Claims. (Cl. 156—500)

This invention relates to the manufacture of extruded plastic structures of net or net-like form as described, for example, in British Patent No. 836,555, or of sheet form having ribs on the surfaces thereof also as described in the above-mentioned patent and also in British patent application No. 29,946/58, now British Patent No. 925,657.

In the extrusion of plastic net, the net or net-like product is manufactured by extruding plastic through two sets of dies having a contacting slideway therebetween which sets are relatively displaced transversely to the direction of extrusion into positions in which die extrusion orifices of one set pass into and through registration with those of the other set to create net intersections and thereafter separate, before coming again into registration, to create the separate net- or mesh-forming strands. The die extrusion orifices of each set of dies may be open on the side adjacent the other set, e.g. as open grooves, so that net intersections are formed integrally when the die orifices of the die sets are in register, net strands being formed by a shearing of the integral intersections as the die orifices move out of register, or the die extrusion orifices of each set of dies may comprise complete apertures spaced a very short distance from line of division between the die sets such that net strands are continuously extruded and brought into crossing contacting relationship as the dies of each set pass into and out of register so that net intersections are formed externally of the dies by adhesion of the crossed strands. Further where the die orifices are open as described above and the die sets are separated by a narrow annular slot, a tubular sheet product is extruded through the slot having inclined ribs on each side as described in the above-mentioned British patents.

An object of the present invention is to provide a modification of the apparatus for producing extruded plastic net or ribbed sheeting according to the methods set out above wherein, in the case of net, the intersections and mesh strands and, in the case of ribbed sheeting, the ribs are formed with a core of preformed filament, textile yarn or flexible wire.

The invention consists in apparatus for the production of extruded plastic net or extruded plastic ribbed sheeting comprising two sets of die orifices which are relatively displaced, transversely to the direction of extrusion, cyclically into and out of positions in which the die discharge orifices pass into and out of registration to extrude the net or the ribs on the ribbed sheeting, wherein a guide tube is located axially within each die discharge orifice and extends rearwardly of the said orifice and laterally (i.e. substantially transversely to the direction of extrusion) away from the contacting slideway between the two sets of die orifices and a plurality of creel or bobbin means are associated with each set of die orifices and are displaceable therewith to supply filament, textile yarn or flexible wire to each of the guide tubes whereby the filaments, the textile yarn or flexible wires form a core for the net strands or the ribs of ribbed sheeting.

Figure 2:
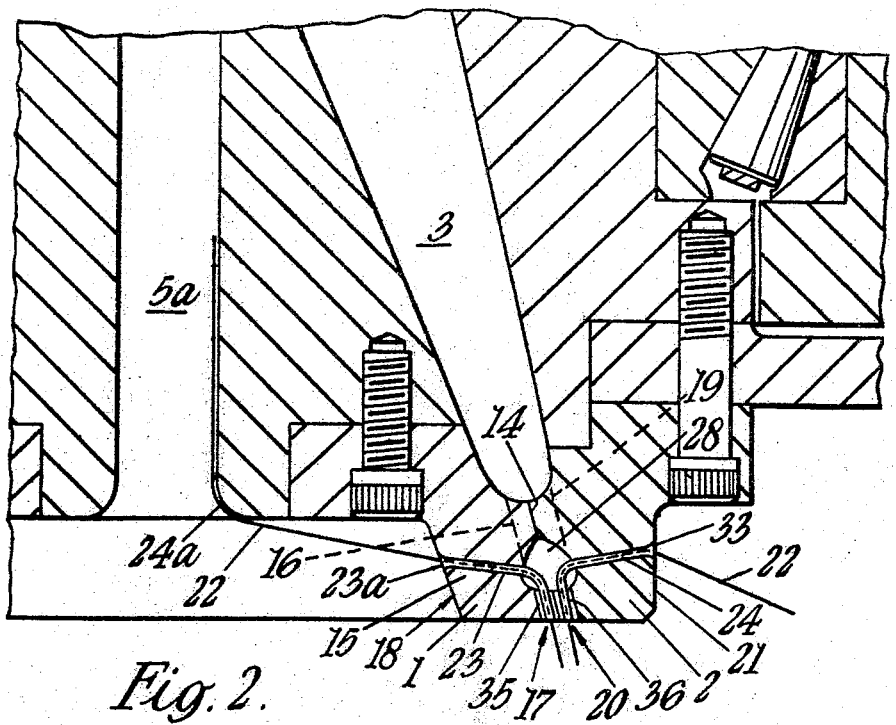
Figure 3:
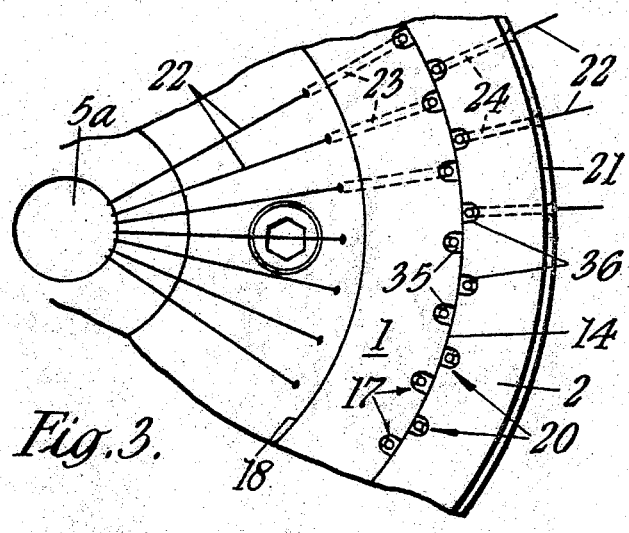
Figure 4:
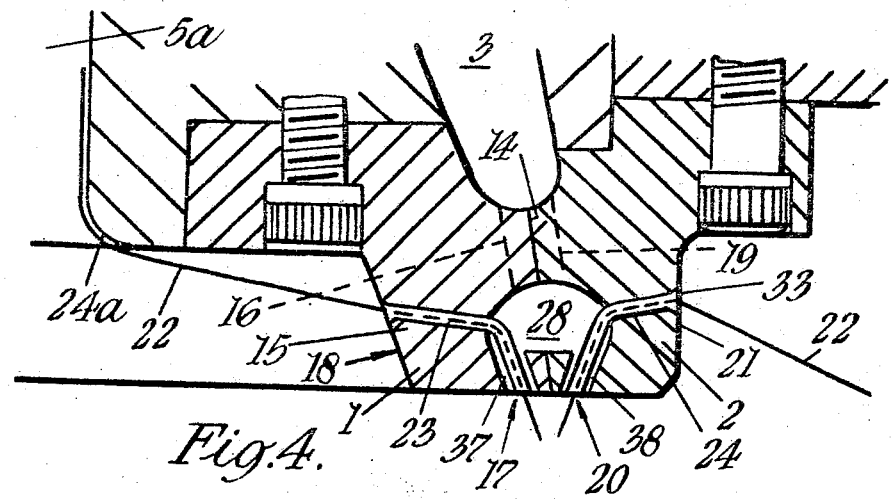
Figure 5:
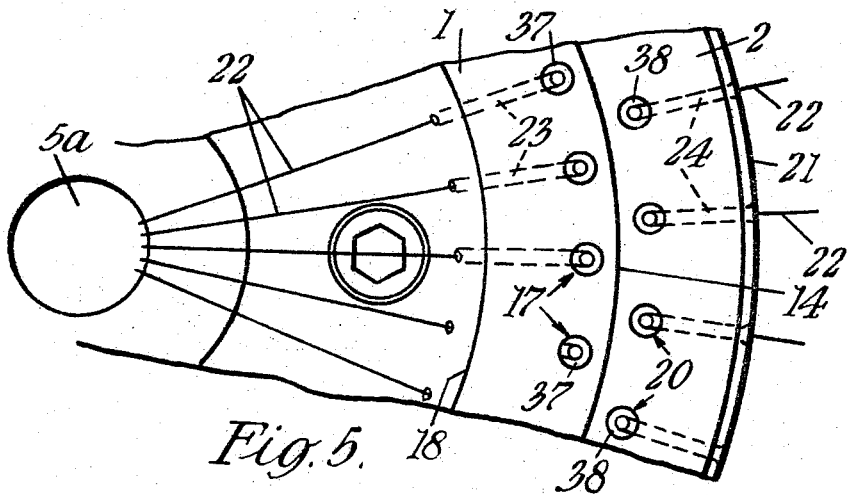
Figure 6:
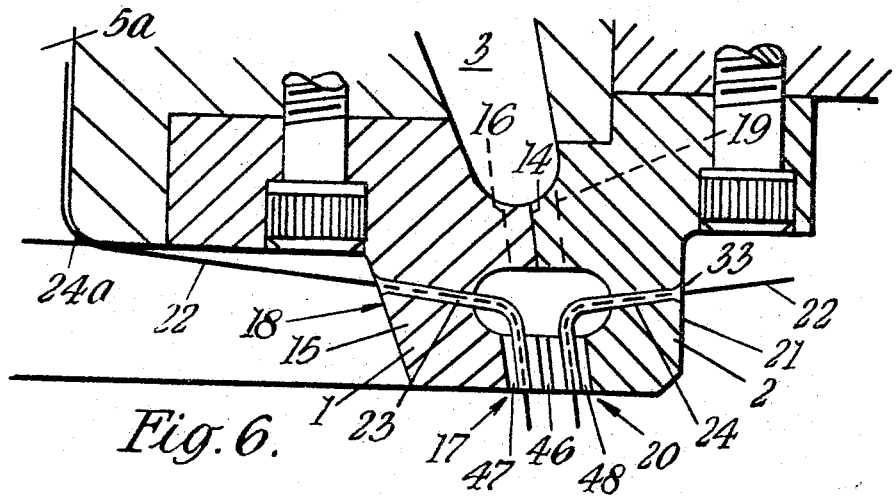
Figure 7:
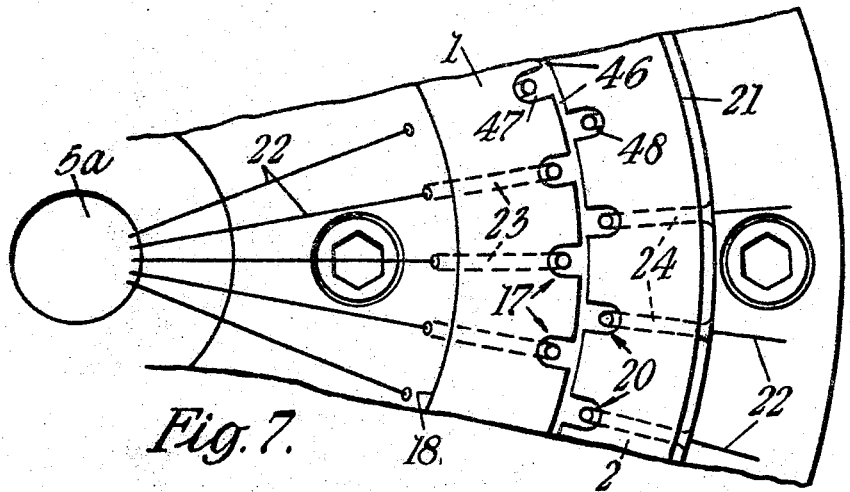
Figure 8:
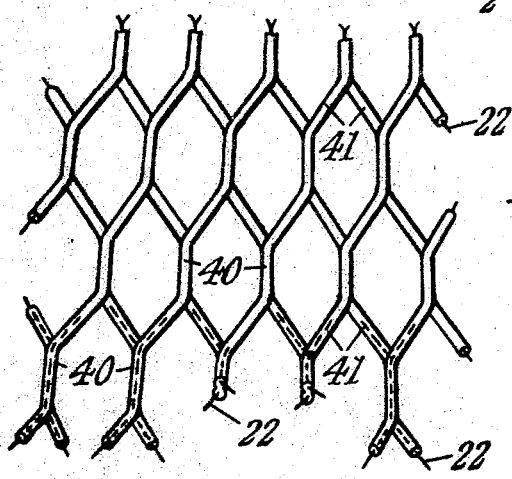
Figure 9:
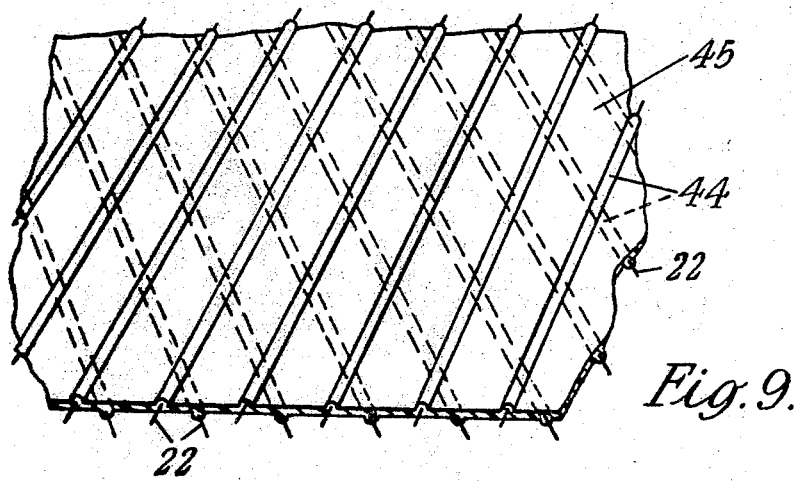

In the accompanying drawings:

FIGURE 1 is a sectional side elevation of one form of the extrusion apparatus according to the present invention, FIGURE 2 is a fragmentary sectional side elevation on an enlarged scale of the die means of FIGURE 1, FIGURE 3 is an underneath plan view of the die means shown in FIGURE 2, FIGURE 4 is a fragmentary sectional side elevation on an enlarged scale similar to FIGURE 2 but showing a modified form of the die means, FIGURE 5 is an underneath plan view of the die means shown in FIGURE 4, FIGURE 6 is a fragmentary sectional side elevation on an enlarged scale similar to FIGURES 2 and 4 but showing rib-forming dies and annular slot for the production of ribbed sheeting according to the present invention, FIGURE 7 is an underneath plan view of the die means shown in FIGURE 6, FIGURE 8 is a perspective view of a net according to the present invention having core material in the strands, and FIGURE 9 is a perspective view of ribbed sheeting according to the present invention having core material in the ribs.

In carrying the invention into effect according to one mode applied by way of example to the extrusion apparatus described in the above-mentioned British Patent No. 836,555, the general form of a suitable apparatus is now described with reference to FIGURE 1.

A pair of co-axial die-carrying members 1 and 2 are mounted to close the lower end of a forced feed plastic supply chamber 3 of extrusion apparatus of known general character, such as illustrated in FIGURE 1. The inner die-carrying member 1 is disc-like and is secured to a conical head 4 mounted on a tubular shaft 5 which extends through the supply chamber 3 and passes out through a tapering plug element 6 at the end remote from the dies. The plug element 6 has its peripheral surface recessed with a pair of diametrically oppositely disposed plastic distributing channels, of which one channel 6a is shown in FIGURE 1 and which meet at 6c opposite the plastic supply orifice 7 which receives plastic from a suitable source via the pressure worm 8. The channels, of which 6a is one, are divergent in the direction of the chamber 3 to disperse the plastic around the entry to the chamber. The shaft 5 passes through a thrust bearing 9 and is axially adjustably secured by nut 10 to locknut 10a. When motion is to be imparted to inner die member 1 the shaft 5 is driven through a chain wheel 11 and chain 11a from any suitable power source or any other appropriate means may be provided to impart motion to said shaft.

The outer die-carrying member 2 is annular and is located around the inner die member 1, and is detachably mounted on a supporting member 12 which also serves as the outer walling of the lower part of the chamber 3. This member may be a fixture if it is intended that the outer die member 2 should permanently be stationary. When the outer die member 2 is to be revolved the supporting member 12 is mounted as shown in bearings carried by the outer two-part housing 13 of the apparatus. The housing 13 may be provided with electrical heating element 13a and, in general, the apparatus may be supplied with heating means where required. The bearings for the member 12 are preferably of the tapered roller thrust type as shown at 12a in FIGURE 1. For the purpose of rotating the outer die member 2 and its support 12 a chain wheel drive 12b may be provided or rotation may be imparted by any other suitable drive means from a convenient power source.

The adjacent peripheral surfaces of the two die members 1 and 2 are accurately ground to provide slideway surfaces 14 which guide and maintain the accurate relationship during motion of the dies carried by the members and in order to provide for the supply of plastic from the chamber 3 to the die means (described hereafter) of the die member 1 and 2, feed ducts (described hereafter) are cut in or through the slideway surfaces 14. While the ground slideway surfaces may be cylindrical, they are preferably frusto-conical with the smaller end of the cone disposed towards the supply source, or alternatively, if desired the taper of the conical surfaces may be reversed so that the pressure in the chamber serves to maintain a close slideway junction.

Both die-carrying members may be detachably engaged with their mounting means, as indicated (with respect to the die means 2) in FIGURE 1, in order that they may be replaced by other die members having a different arrangement or size of dies.

The above described apparatus may be used to produce (a) net or netting extruded as a continuous entity, or (b) sheeting having projecting integral ribs or ribbing on one or both surfaces. To this end the die-carrying members 1 and 2 also essentially include, in addition to the ducted slideway 14, die means formed or provided according to the product (a) or (b) above required, as will be described hereinafter.

Considering the die means of the inner and outer die members 1 and 2 in greater detail with reference to FIGURES 2 to 7 of the accompanying drawings, the inner die member 1 has a peripheral flanged portion 15 extending in the direction of extrusion, the outer peripheral face of which forms one surface of the contacting slideway 14 between the two die members and through, or adjacent to, which face feed ducts 16 and the actual die means 17 of the inner set of dies are formed. The inner face 18 of the peripheral flange 15 faces towards the axis of the inner die member 1.

The outer die member 2 has an inner face which forms the other surface of the contacting slideway 14 between the two die members and through, or adjacent to, which face feed ducts 19 and the actual die means 20 of the outer set of dies are formed. The outer face 21 of the outer die member 2 faces away from the axis of the die members.

In order to provide for the introduction of the core material indicated at 22, e.g. filament, textile yarn or flexible wire, into the net or ribbed sheet structure as extruded, guide tube means 23, 24 is provided axially of each die means orifice 17 and 20. The guide tube means 23 for the die means 17 of the inner die member 1 extend axially rearwardly from the die orifices thereof and then each is bent to extend transversely of the die orifice axis and radially inward towards the axis of the inner die member to terminate on the inner face 18 of the peripheral flange 15 of the inner die member 1, the mouth 23a of the guide tube means preferably being flared.

The inner die member 1 is mounted on central shaft means 5 which serves to support and, if necessary, rotate the inner die member 1, and the shaft 5 has an axial bore 5a to provide a passageway through which the core material (e.g. filaments, textile yarn or flexible wires) is led to the guide tube means 23, the core material strands radiating from the open end of the shaft bore to the circumferentially distributed guide tube means 23. The open end 24a of the shaft bore 5a is flared to provide a smooth bearing surface for the change of direction of the core strands 22.

The core material 22a for the inner die means 17 is conveniently supplied from creels, bobbins or the like 30 carried by a structure 31 mounted on the central shaft means 5 at or adjacent the end of the shaft bore 5a remote from the inner die member 1, the core material 22 being led from the creels, bobbins or the like 30 to the shaft bore 5a.

Each guide tube means 24 for the die means 20 of the outer die member 2 extends axially rearwards from each die orifice thereof and then is bent to extend transversely of the die orifice axis and radially outwards away from the axis of the annular outer die member 2. Each guide tube means terminates on the outward face 21 of the outer die member annulus, the mouth 33 of the guide tube means 24 preferably being flared.

The core material 22 for the outer die means 2 is conveniently supplied from creels, bobbins or the like 34 carried by a structure 35 supported on means mounting the outer die member 2 and the core material 22 from the creels, bobbins or the like 34 is led radially inward therefrom to the guide tube means 24 of the outer die member 2.

The die members 1, 2 are preferably formed so as to have an annular reservoir 28 between the contacting slideway surfaces 14 of the die members and intermediate the main supply of plastic 3 and the die means orifices 17, 20 as described in our co-pending British patent application No. 10,863/59, now British Patent No. 925,658. The bending of the guide tube means 22, 24 from extending axially of the die means orifices 17, 20 to extending transversely thereof is conveniently located in the space provided by the annular reservoir 28.

The means, described above, for introducing the core material 22 into the die means 17, 20 of the die members 1, 2 may be applied to the production of cored netting, see FIGURE 8, as illustrated in detail in FIGURES 2 to 5 or to the production of ribbed sheeting the ribs of which are cored, see FIGURE 9, as illustrated in detail in FIGURES 6 and 7.

In the form for the production of cored netting illustrated in FIGURES 2 and 3, the die means 17, 20 have die orifices 35 and 36 (see particularly FIGURE 3) which open onto the contacting slideway surface 14 such that when the orifices 35 of one set are in register with the orifices 36 of the other set integral net intersections 40 (see FIGURE 8) are extruded, which intersections are sheared into net strands 41 (see FIGURE 8) as the die orifices 35, 36 move out of register, e.g. as described in the abovementioned British Patent No. 836,555.

Alternatively cored netting may be produced by the use of die means 17, 20 as illustrated in FIGURES 4 and 5, wherein the die orifices 37 of one set and 38 of the other set are spaced from the contacting slideway surface 14 such that cored net strands are at all times extruded but that as the orifices 37 of one set pass the orifices 38 of the other set the strands cross one another and adhere to form the net intersections.

For the production of ribbed sheeting (see FIGURE 9) having surface ribs 44 on each side of a sheet 45, the die means (see FIGURES 6 and 7) comprise an annular sheet forming slot 46 and set of open rib-forming dies 47 and 48 as described in the above-mentioned co-pending patent application No. 29,946/58, now British Patent No. 925,657.

When plastic extrusion commences, accompanied by relative rotation of the die means 1 and 2, draw-off means (not shown) for the extruded net or ribbed sheet also draws off the core material 22 through the guide means 23, 24 at the same linear speed as that of the extrusion so as to produce a net structure (FIGURE 8) the plastic strands 41 and intersections 40 of which are thereby cored with the filaments, textile yarns or the like 22, or, in the case of ribbed sheet (FIGURE 9) a sheet structure 45 having ribs 44 on each face thereof which are cored with the filaments, textile yarns or the like 22.

I claim:

1. In plastic extrusion apparatus comprising two sets of die orifices having a contacting slideway therebetween, and means for relatively displacing said sets, transversely to the direction of extrusion, cyclically into and out of positions in which the die discharge orifies pass into and out of registration to extrude strands, the improvement which comprises in combination guide tube means located axially within each die discharge orifice and extending rearwardly of the direction of extrusion and then laterally away from the slideway between the two sets of die orifices and a plurality of bobbin means associated with each set of die orifices and displaceable therewith to supply continuous filament to each of the guide tube means whereby the filaments form a core for the strands.

2. Apparatus as claimed in claim 1, wherein the die discharge orifices of each set are open on their adjacent sides such that when a die discharge orifice of one set is in register with the die discharge orifice of the other set a single common discharge orifice is momentarily formed to produce a net intersection having two spaced cores extending longitudinally therethrough.

3. Apparatus as claimed in claim 1, wherein the die discharge orifices of each set are complete orifices spaced a short distance from the slideway between the two sets of die orifices and are fed by die ducts inclined towards each other in the direction of extrusion, the arrangement being such that the die orifices of each set extrude cored strands which cross and adhere to one another as the orifices of each set pass one another to form the net intersections each having two spaced cores extending therethrough.

4. Apparatus as claimed in claim 1, wherein the sets of die orifices are arranged on concentric circles and relatively rotated to provide the cyclic movement of the die orifices into and out of registration and the bobbin means supplying the filaments to the die orifices are also circularly arranged concentrically with the die orifices, the bobbins associated with each set of die orifices moving at the same angular speed as the associated die orifices.

5. Apparatus as claimed in claim 4, wherein the die orifices of each set are formed in a circular die member in an annular flange thereof having an inner and an outer peripheral face, the outer face of the inner die member and the inner face of the outer die member forming together the slideway between the two sets of die orifices and the guide tube means for the inner die member opening on to the inner face of the flange thereon and the guide tube means for the outer die member opening on to the outer face of the flange thereon.

6. Apparatus as claimed in claim 5, wherein the filaments, for the inner set of die orifices are led to the guide tube means therefore through a guide opening disposed axially of the inner die member.

7. Apparatus as claimed in claim 1, wherein the guide tube means each comprises a small bore rigid tube whose laterally extending portion is secured in the member in which the die orifices are formed, and whose other portion projects into and axially of the associate die orifice.

8. In plastic extrusion apparatus comprising two die-carrying members each having a set of die discharge orifices therein and having a contacting slideway therebetween, and means for relatively displacing said die-carrying members transversely to the direction of extrusion, cyclically into and out of positions in which the die discharge orifices pass into and out of registration to extrude strands, the improvement which comprises, in combination, guide tube means located axially within each die discharge orifice and extending rearwardly of the direction of extrusion and then laterally away from the slideway between the die-carrying members, a plurality of bobbin means associated with each set of die orifices and displaceable therewith to supply continuous filament to each guide tube means whereby the filaments form a core for the strands, said sets of die discharge orifices being separated by a slot contiguous to said discharge orifices at the point of discharge thereof through which plastic sheet is extruded, the die orifices forming ribs on each surface of said sheet such that the ribs on each side are parallel to one another, and the ribs on one side are inclined with respect to the ribs on the other side of the sheet.

References Cited

UNITED STATES PATENTS 2,791,803  5/1957  Henning _____ 18—13
3,019,147  1/1962  Nalle.

FOREIGN PATENTS 552,251  11/1956  Belgium.

ALEXANDER WYMAN, *Primary Examiner.*

M. E. BERGERT, *Examiner.*

R. J. CARLSON, *Assistant Examiner.*